United States Patent [19]

Kashiwai et al.

[11] Patent Number: 5,264,526

[45] Date of Patent: Nov. 23, 1993

[54] STABILIZED ACRYLIC FIBERS AND POLYURETHANE ELASTOMER FIBERS AND PROCESS FOR MAKING SAME

[75] Inventors: Kazuto Kashiwai, Akashi; Michihira Endoh, Nishiwaki; Shinichi Kumagae, Kobe, all of Japan

[73] Assignee: Ipposha Oil Industries Co., Ltd., Hyogo, Japan

[21] Appl. No.: 794,932

[22] Filed: Nov. 20, 1991

[30] Foreign Application Priority Data

Nov. 20, 1990 [JP] Japan ................. 2-316837

[51] Int. Cl.$^5$ .............................. C08L 33/20
[52] U.S. Cl. .................... 525/219; 525/220; 525/238
[58] Field of Search ............. 525/219, 220, 238

[56] References Cited

U.S. PATENT DOCUMENTS

| | | | |
|---|---|---|---|
| 3,313,866 | 4/1967 | Horton et al. | |
| 3,328,491 | 6/1967 | Fertig et al. | 524/37 |
| 3,365,421 | 1/1968 | Horton et al. | |
| 4,164,522 | 8/1979 | Gibbs | 525/309 |
| 4,524,193 | 6/1985 | Yamazaki et al. | 526/287 |

FOREIGN PATENT DOCUMENTS

| | | |
|---|---|---|
| 51-076345 | 7/1976 | Japan . |
| 58-084843 | 5/1983 | Japan . |
| 2-043257 | 2/1990 | Japan . |

OTHER PUBLICATIONS

Polymer Preprints. 28(1) Apr. 1987, pp. 205-206.
Encyclopedia of Chemical Technology, vol. 1, John Wiley & Son. 1978, pp. 364-366.
Encyclopedia of Polymer Science and Engineering, John Wiley & Sons, vol. 1, 1985, p. 350.
Journal of Macromolecular Science-Chemistry, A24(9), 1987, pp. 1085-1097.

*Primary Examiner*—Ana L. Carrillo
*Assistant Examiner*—Thomas Hamilton, III
*Attorney, Agent, or Firm*—Burgess, Ryan and Wayne

[57] ABSTRACT

Light-stabilized acrylonitrile polymer fiber and polyurethane elastomer fiber are made by incorporating a copolymer of 20-80 weight % of a benzophenone compound of the formula:

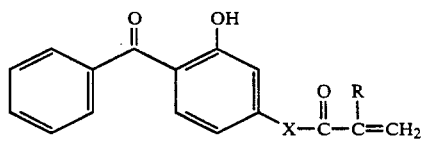

wherein R is hydrogen or methyl and X is —O—, —OCH$_2$CH$_2$O— or —OCH$_2$CH(OH)CH$_2$O—, and 80-20 weight % of an ethylenically unsaturated monomer with an acrylonitrile polymer or a polyurethane elastomer; and a dope of the polymer mixture in an organic solvent is wet-spun into a fiber.

5 Claims, No Drawings

STABILIZED ACRYLIC FIBERS AND POLYURETHANE ELASTOMER FIBERS AND PROCESS FOR MAKING SAME

BACKGROUND OF THE INVENTION (1) Field of the Invention

This invention relates to light stabilization of acrylic fibers and polyurethane elastomer fibers. More particularly, it relates to light-stabilized acrylonitrile polymer fibers and polyurethane elastomer fibers, which have incorporated therein a 2-hydroxybenzophenone copolymer as a light stabilizer, and a process for making the light-stabilized acrylonitrile polymer fibers and polyurethane elastomer fibers.

(2) Description of the Related Art

Acrylic fibers, polyurethane elastomer fibers and other organic polymer fibers as used outdoors are exposed to sun light and these fibers as used indoors are exposed to light of a fluorescent lamp. The sun light and the light of a fluorescent lamp include ultraviolet rays having wavelengths of 200 to 400 nm which are baneful to polymeric materials. Ultraviolet rays excite functional groups and/or a residual catalyst, which are present in a polymeric material, to cause a photo-degradation reaction whereby the polymeric material is subject to photo-degradation and color fading.

To protect acrylic fibers and other fibers composed of a polymeric material from photo-degradation and color fading, an ultraviolet absorber is incorporated in the polymeric material to be shaped into fibers. By the incorporation of an ultraviolet absorber, the substantial part of the baneful ultraviolet rays are absorbed, and consequently, the photo-degradation and color fading of the acrylic fibers and other fibers are minimized.

The incorporated ultraviolet absorber should not be volatilized, dissolved or decomposed in the fiber-spinning step or the dyeing step, and should not bleed out to the fiber surface after the fiber is made into textile goods. Acrylic fibers (i.e., acrylonitrile polymer fibers) and polyurethane elastomer fibers are made usually by a wet spinning process wherein a spinning dope of an acrylonitile polymer or polyurethane elastomer in an organic solvent such as dimethylformamide (DMF), dimethylacetamide (DMAc) or dimethylsulfoxide (DMSO) is extruded into a coagulating bath composed of, for example, an aqueous solution of the organic solvent used or a water/methanol mixture and, in the wet-spinning step, a conventional ultraviolet absorber incorporated in the spinning dope is undesirably dissolved into a coagulating bath to a significant extent. Furthermore, when acrylonitrile polymer fibers and polyurethane elastomer fibers are dyed or textile goods thereof are laundered, the incorporated ultraviolet absorber is dissolved into a dyeing bath or a laundering bath to a significant extent. Thus, the light stability of the ultraviolet absorber-incorporated acrylonitrile polymer fibers and polyurethane fibers varies greatly depending upon the solubility of the ultraviolet absorber in a coagulating bath, a dyeing bath and a laundering bath and the compatibility of the ultraviolet absorber in the polymer.

Conventional ultraviolet absorbers include, for example, 2-hydroxybenzophenones such as 2,4-dihydroxybenzophenone, 2,2',4,4'-tetrahydroxybenzophenone and 2-hydroxy-4-octoxybenzophenone, and 2-hydroxyphenylbenzotriazoles such as 2-(2'-hydroxy-5'-methylphenyl)benzotriazole, 2-(2'-hydroxy-3'-t-butyl-5'-methylphenyl)-5-chlorobenzotriazole and 2-(2'-hydroxy-3',5'-dibutylphenyl)-5-chlorobenzotriazole.

These ultraviolet absorbers have the above-mentioned problems. Namely, these ultraviolet absorbers have a molecular weight of about 200 to about 400 and have a poor compatibility with an acrylonitrile polymer and polyurethane and a poor heat resistance, and, during wet spinning, dyeing or laudering, these ultraviolet absorbers are dissolved into a coagulation bath, a dyeing bath or a laundering bath.

In the case of acrylonitrile polymer fibers made of an acrylonitrile copolymer composd of acrylonitrile and a halogen-containing monomer such as vinyl chloride or vinylidene chloride, a larger amount of an ultraviolet absorber must be incorporated therein than in the other polymer fibers to attain the intended light stability, and most ultraviolet absorbers have a poor compatibity with the halogen-containing acrylonitrile copolymer.

SUMMARY OF THE INVENTION

The primary object of the present invention is to provide acrylonitrile polmer fibers and polyurethane elastomer fibers, which are stabilized against ultraviolet light, and more specifically which contain an ultraviolet absorber that exhibits a good compatibility with the acrylonitrile polymers and polyurethane elastomers and that is dissolved only to a negligible extent in a coagulating bath, a dyeing bath and a laundering bath.

In one aspect of the present invention, there is provided a stabilized acrylonitrile polymer fiber or polyurethane elastomer fiber which is comprised of an acrylonitrile polymer or a polyurethane elastomer, respectively, and a stabilizing amount of a copolymer comprising 20 to 80% by weight of units derived from a benzophenone compound represented by the following formula (I):

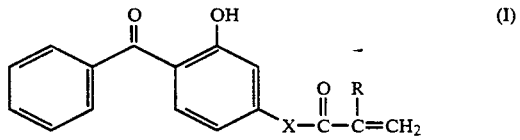

wherein R represents hydrogen or a methyl group and X represents —O—, —OCH$_2$CH$_2$O— or —OCH$_2$CH(OH)CH$_2$O—, and 80 to 20% by weight of units derived from an ethylenicaly unsaturated monomer copolymerizable therewith.

In another aspect of the present invention, there is provided a process for making a stabilized acrylonitrile polymer fiber or polyurethane elastomer fiber which comprises preparing a spinning dope of a mixture of an acrylonitrile polymer or a polyurethane elastomer and a stabilizing amount of a benzophenone compound represented by the above formula (I) in an organic solvent, and extruding the spinning dope into a coagulating bath to coagulate the extrudate.

DETAILED DESCRIPTION OF THE PREFERRED EMBODIMENTS

The light stabilizer or ultraviolet absorber used in the present invention is a copolymer comprising 20 to 80% by weight of units derived from a benzophenone compound represented by the above formula (I) and 80 to 20% by weight of an ethylenically unsaturated monomer copolymerizable therewith. As the benzophenone compound of the formula (I), there can be mentioned, for example, 2-hydroxy-4-methacryloxybenzophenone, 2-hydroxy-4-(2-methacryloxy)ethoxybenzophenone, 2-hydroxy-4-(2-acryloxy)ethoxybenzophenone and 2-hydroxy-4-(2-hydroxy-3-methacryloxy)propoxybenzopheneone.

The monoethylenically unsaturated monomer copolymerizable with the benzophenone compound of the formula (I) includes, for example, an alkyl acrylate having 1 to 8 carbon atoms, preferably 1 to 4 carbon atoms, in the alkyl group, an alkyl methacrylate having 1 to 8 carbon atoms, preferably 1 to 4 carbon atoms, in the alkyl group, an alkyl vinyl ether having 1 to 8 carbon atoms, preferably 1 to 4 carbon atoms, in the alkyl group, and an alkyl vinyl ester having 1 to 8 carbon atoms, preferably 1 to 4 carbon atoms, in the alkyl group.

As the alkyl acrylate, there can be mentioned, for example, methyl acrylate, ethyl acrylate, propyl acrylate, butyl acrylate and 2-ethylhexyl acrylate. As the alkyl methacrylate, there can be mentioned, for example, methyl methacrylate, ethyl methacrylate, propyl methacrylate and butyl methacrylate. As the alkyl vinyl ether, there can be mentioned, for example, methyl vinyl ether, ethyl vinyl ether and buthyl vinyl ether. As the alkyl vinyl ester, there can be mentioned, for example, vinyl acetate, vinyl acrylate, vinyl butyrate and vinyl crotonic acid.

A homopolymer of the benzophenone compound of the formula (I) has a poor compatibility with an acrylonitrile polymer and a polyurethane elastomer, and therefore, if this homopolymer is incorporated as an ultraviolet absorber, the homopolymer readily bleeds out and the stability of the acrylonitrile polymer fiber and the polyurethane elastomer fiber against ultraviolet rays decreases with time. In contrast, the copolymer of the benzophenone compound used in the present invention exhibits a good compatibility with an acrylonitrile polymer and a polyurethane elastomer, and can impart an enhanced and durable light stability to the acrylonitrile polymer and the polyurethane elastomer without a bad influence upon the physical properties thereof. The copolymerization ratio of the benzophenone compound of the formula (I) in the copolymer is 20 to 80% by weight, preferably 20 to 70% by weight. If the copolymerization ratio exceeds 80% by weight, the compatibility of the copolymer with an acrylonitrile polymer and a polyurethane elastomer is low. If the copolymerization ratio is smaller than 20% by weight, the light stability of the acrylonitrile polymer and the polyurethane elastomer is insufficient.

The copolymer of the benzophenone compound used in the present invention preferably has a weight average molecular weight of 5,000 to 100,000, more preferably 15,000 to 70,000. If the molecular weight is too large, the solubility of the benzophenone copolymer in a spinning solvent used in the wet spinning is low and the wet spinning becomes difficult, and the compatibility of the benzophenone copolymer with an acrylonitrile polymer and the polyurethane elastomer is low. If the molecular weight is too small, the benzophenone copolymer is dissolved in a coagulation bath, a dyeing bath and a laundering bath and bleeds out from the fibers.

The copolymerization of the benzophenone compound of the formula (I) with the copolymerizable ethylenically unsaturated monomer can be carried out by a conventional polymerization procedure such as, for example, a solution, suspension or emulsion polymerization procedure.

The acrylonitile polymer includes those which are conventionally used for acrylic fibers and may be either a homopolymer or a copolymer. The acrylonitrile copolymer is comprised of at least about 50% by weight, based on the copolymer, of acrylonitrile and not more than about 50% by weight, based on the copolymer, of a copolymerizable monoethylenically unsaturated monomer. The copolymerizable monomer includes, for example, vinyl acetate, vinyl chloride, vinylidene chloride and methyl methacrylate.

The polyurethane elastomer is an elastomer made from (a) an organic diisocyanate such as 4,4'-diphenylmethane diisocyanate, (b) a substantially linear polymer having groups with an active hydrogen atom, e.g., hydroxyl groups at both terminals, and having a molecular weight of 600 to 5,000, such as a polyester, a polylactone, a polyether, a polyesteramide, a polythioether or a polyhydrocarbon, and (c) a polyfunctional active hydrogen-containing compound (chain extender) such as hydrazine, a polyhydrazide, a polysemicarbazide, a polyol, a polyamine and hydroxylamine.

The light-stabilized acrylonitrile polymer fiber and polyurethane elastomer fiber can be made as follows. First, a spinning dope is prepared by dissolving an acrylonitrile polymer or a polyurethane elastomer together with the copolymer of a benzophenone compound of the formula (I) in an organic solvent such as dimethylformamide, dimethylacetamide or dimethylsulfoxide. The concentration of the polymer or the elastomer and the benzophenone copolymer in the spinning dope and the manner in which the polymer or the elastomer and the benzophenone copolymer are dissolved in an organic solvent are not particularly limited and may be conventional. The concentration of the acrylonitrile polymer or the polyurethane elastomer in the spinning dope is usually from about 20% to about 40% by weight based on the weight of the spinning dope.

The proportion of the benzophenone copolymer to the acrylonitrile polymer or the polyurethane elastomer is not particularly limited provided that the amount of the benzophenone copolymer is sufficient for stabilizing the acrylonitrile polymer fiber or the polyurethane elastomer fiber. Usually the amount of the benzophenone copolymer is from 0.01 to 10% by weight, preferably from 0.5 to 10% by weight, based on the weight of the acrylonitrile polymer or the polyurethane elastomer. If the amount of the benzophenone copolymer is too small, the intended light stabilization cannot be obtained, and if the amount of the benzophenone copolymer is too large, the properties of the fiber are undesirably varied.

The spinning dope is subjected to a wet spinning, i.e., is extruded through a spinneret of a nozzle into a coagulation bath whereby the extrudate is coagulated. The wet spinning procedure itself may be conventional. As the coagulation bath for the acrylonitrile polymer fiber, there can be mentioned, for example, an aqueous solution containing about 30 to about 60% by weight of an organic solvent such as dimethylformamide, dimethylacetamide ordimethylsulfoxide. As the coagulation bath for the polyurethane elastomer, there can be mentioned, for example, an aqueous solution containing from about 5 to 10% by weight of ethylenediamine or triethylenediamine.

If desired, additives such as other light stabilizers (ultraviolet stabilizers), an antioxidant, a pigment and a dyestuff may be incorporated in the acrylonitrile polymer or the polyurethane elastomer.

The invention will now be described in detail with reference to the following examples that by no means limit the scope of the invention.

EXAMPLE 1

Preparation of Copolymer of 2-Hydroxy-4-methacryloxybenzophenone with Methyl Methacrylate A separable flask provided with a reflux condenser, a dropping funnel, a thermometer, a nitrogen gas-introducing tube and a stirrer and having a capacity of 1 liter was charged with 111.5 g of 2-hydroxy-4-methacryloxybenzophenone, 445 g of methyl methacrylate, 0.4 g of lauryl mercaptan and 560 g of ethyl acetate. While a nitrogen gas was blown through the tube into the flask, the temperature of the content was elevated to 50° C. A solution of 1.66 g of azobisisobutyronitrile (hereinafter referred to as "AIBN") in a minor amount of ethyl acetate was added dropwise into the flask over a period of about 20 minutes. After the completion of the addition, the temperature of the content was elevated to 70° C. and polymerization was conducted for about 8 hours at a strring rate of 100 rpm in an nitrogen gas atmosphere. After the completion of polymerization, the content was cooled to room temperature and then put into methanol in an amount of about five times of the content to precipitate the thus-produced copolymer. The precipitate was subjected to suction filtration and the collected copolymer was washed with a small amount of methanol and then dried. The properties of the copolymer are shown in Table 1.

EXAMPLE 2

Preparation of Copolymer of 2-Hydroxy-4-(2-methacryloxy)ethoxybenzophenone with Ethyl Methacrylate By substantialy the same procedure as that described in Example 1, a copolymer was prepared wherein the flask was charged with 167 g of 2-hydroxy-4-(2-methacryloxy)ethoxybenzophenone, 450 g of ethyl methacrylate, 1.6 g of AIBN, 0.65 g of lauryl mercaptan and 615 g of ethyl acetate. All other conditions remained substantilly the same. The properties of the thus-prepared light yellow copolymer powder are shown in Table 1.

EXAMPLE 3

Preparation of Copolymer of 2-Hydroxy-4-(2-hydroxy-3-methacryloxy)propoxybenzophenone with Methyl Vinyl Ether By substantially the same procedure as that described in Example 1, a copolymer was prepared wherein the flask was charged with 390 g of 2-hydroxy-4-(2-hydroxy-3-methacryloxy)propoxybenzophenone, 180 g of methyl vinyl ether, 1.65 g of AIBN, 0.7 g of lauryl mercaptan and 570 g of ethyl acetate. All other conditions remained substantially the same. The properties of the thus-prepared light yellow copolymer powder are shown in Table 1.

EXAMPLE 4

Preparation of Copolymer of 2-Hydroxy-4-methacryloxybenzophenone with Butyl Acrylate By substantially the same procedure as that described in Example 1, a copolymer was prepared wherein the flask was charged with 150 g of 2-hydroxy-4-methacryloxybenzophenone, 280 g of buthyl acrylate, 1.8 g of AIBN, 0.7 g of lauryl mercaptan and 400 g of ethyl acetate. All other conditions remained substantially the same. The properties of the thus-prepared light yellow copolymer powder are shown in Table 1.

EXAMPLE 5

Preparation of Copolymer of 2-Hydroxy-4-(2-acryloxy)ethoxybenzophenon with Vinyl Acetate By substantially the same procedure as that described in Example 1, a copolymer was prepared wherein the flask was charged with 120 g of 2-hydroxy-4-(2-acryloxy)ethoxybenzophenone, 280 g of vinyl acetate, 2.0 g of AIBN, 0.9 g of lauryl mercaptan and 400 g of ethyl acetate. All other conditions remained substantially the same. The properties of the thus-prepared light yellow copolymer powder are shown in Table 1.

TABLE 1

Properties of Benzophenone Copolymers Prepared in Examples 1 through 5

| Example No. | Appearance (powder) | Weight average[1] molecular weight | UV absorbance (T%)[2] 290 nm | 330 nm |
|---|---|---|---|---|
| 1 | White | $4.2 \times 10^4$ | 28 | 40 |
| 2 | Light yellow | $3.5 \times 10^4$ | 15 | 29 |
| 3 | Light yellow | $2.8 \times 10^4$ | 4 | 12 |
| 4 | Light yellow | $3.0 \times 10^4$ | 10 | 22 |
| 5 | Light yellow | $2.5 \times 10^4$ | 18 | 31 |

[1] The weight average molecular weight was determined according to gel permeation chromatography and expressed in terms of polystyrene reference standard.
[2] The ultraviolet absorbing characteristics were evaluated according to ultraviolet spectrophotometry wherein the ultraviolet transmission at wavelengths of 290 nm and 330 nm were measured on a solution of 5 mg of the benzophenone copolymer in 100 ml of chloroform.

EXAMPLE 6

Production and Evaluation of Stabilized Acrylic Fiber

An acrylonitrile polymer prepared by copolymerization of 70% by weight of acrylonitrile, 10% by weight of vinyl acetate and 20% by weight of vinylidene chloride was dissolved in DMAc to prepare a solution containing 20% by weight of the acrylonitrile polymer. Each of the benzophenone copolymers prepared in Examples 1 through 5 was added in an amount shown in Table 2 to the solution to prepare a spinning dope. The spinning dope was extruded through a spinneret with 100 orifices having a diameter of 0.1 mm into a coagulation bath composed of an aqueous solution containing 50% by weight of DMAc in a conventional manner. The coagulated fiber was washed with water and then dried.

The thus-produced acrylic fiber was subjected to a fadeometer exposure test using a fadeometer (FA-2 type, supplied by Toyo Rika Kogyo K.K.). The color change of the fiber was determined by a color difference meter (Z-1001 DP type, supplied by Nihon Denshoku Kogyo K.K.). The results are shown in Table 2.

COMPARATIVE EXAMPLE 1

Production and Evaluation of Conventionally Stabilized Acrylic Fiber

By substantially the same procedure as that described in Example 1, an acrylic fiber was made wherein 3% by weight of 4-octoxy-2-hydroxybenzophenone instead of the ultraviolet absorbers prepared in Examples 1 through 5 was added to the solution of the acrylonitrile/vinyl acetate/vinylidene chloride copolymer in DMAc. All other conditions remained substantially the same. The light stability of the acrylic fiber was evaluated in the same manner as that described in Example 6. The results are shown in Table 2.

TABLE 2

Fadeometer Exposure Test of Acrylic Fibers

| Benzophenone copolymer prepared in: | Amount of copolymer (wt %) | ΔE change with exposure time*1 | | | | |
|---|---|---|---|---|---|---|
| | | 20 hrs | 40 hrs | 60 hrs | 100 hrs | 200 hrs |
| Example 1 | 10.0 | 1.4 | 1.5 | 1.5 | 1.9 | 2.9 |
| Example 2 | 7.0 | 1.7 | 1.7 | 1.9 | 2.5 | 3.7 |
| Example 3 | 0.5 | 1.9 | 2.1 | 2.3 | 3.1 | 4.0 |
| Example 4 | 3.0 | 1.6 | 1.8 | 2.1 | 2.6 | 3.5 |
| Example 5 | 3.0 | 1.6 | 1.8 | 2.1 | 2.7 | 3.9 |
| Control | — | 2.5 | 3.1 | 4.0 | 6.7 | 9.4 |
| Comp. Ex. 1 | 3.0 | 2.0 | 2.5 | 3.8 | 6.2 | 8.9 |

*1 Change of color difference ΔE with exposure time.

EXAMPLE 7

Color Fastness Test of Dyed Acrylic Fibers

Each of the acrylic fibers made in Example 6 and Comparative Example 1 was dyed under the following conditions, and the color fastness to light was tested according to JIS L 0842 using a carbon-arc lamp. The test results expressed according to JIS L 0841 are shown in Table 3.

TABLE 3

Color Fastness Test of Dyed Acrylic Fiber

| Benzophenone copolymer prepared in: | Amount of benzophenone copolymer (wt %) | Rating of fastness |
|---|---|---|
| Example 1 | 10.0 | 6–7 |
| Example 2 | 7.0 | 6 |
| Example 3 | 0.5 | 4–5 |
| Example 4 | 3.0 | 4–5 |
| Example 5 | 3.0 | 4–5 |
| Control | — | 2 |
| Comp. Ex. 1 | 3.0 | 3 |

EXAMPLE 8

Production of Stabilized Polyurethane Elastomer Fibers and Evaluation of Light Fastness A polyurethane elastomer prepared by a conventional polymerization procedure from 65 parts by weight of polyethylene adipate, 7 parts by weight of 1,4-butanediol and 28 parts by weight of 4,4'-diphenylmethane diisocyanate was incorporated with a 60% by weight solution in DMF of each of the benzophenone copolymers prepared in Examples 1 through 4 to prepare a fiber-spinning dope. The spinning dope contained 30% by weight of the polyurethane elastomer and 3% by weight, based on the weight of the polyurethane elastomer, of the benzophenone copolymer. The spinning dope was extruded by a screw extruder through a spinneret with orifices having a diameter of 1 mm into a coagulation bath comprisd of an aqueous solution containing 5% by weight of ethylenediamine and taken up at a rate of 500 m/min on a take-up roll. Then the thus-obtained fiber was washed with water and then died.

The light stability of the polyurethane elastomer fibers was evaluated according to JIS L-0804 using a grey scale for assessing color change. The color difference was measured and the rating therefor was expressed according to JIS L 0804. The results are shown in Table 4.

TABLE 4

Light Stability of Polyurethane Elastomer Fibers

| Benzophenone copolymer prepared in: | Rating of color difference |
|---|---|
| Example 1 | 3 |
| Example 2 | 3 |
| Example 3 | 3–4 |
| Example 4 | 3 |
| Not added | 1 |

As seen from the examples, the acrylonitrile polymer fiber and polyurethane elastomer fiber of the present invention, which have incorporated therein the specified benzophenone copolymer as a light stabilizer, exhibit a good light stability. The benzophenone copolymer has a good compatibility with an acrylonitrile polymer and a polyurethane elastomer and, when the acrylonitrile polymer fiber or polyurethane elastomer fiber is made, dyed or laundered, the specified benzophenone copolymer is dissolved in a coagulation bath, a dyeing bath or a laundering bath only to a negligible extent. It is to be especially noted that an acrylic fiber made from an acrylonitrile copolymer containing a halogen-containing monomer, to which the specified benzophenone copolymer has been incorporated, exhibits a satisfactory light stability.

We claim:

1. A stabilized acrylonitrile polymer fiber which comprises an acrylonitrile polymer, and a stabilizing amount of a copolymer comprising 20 to 80% by weight of units which are the residues of a benzophenone compound represented by the following Formula (II):

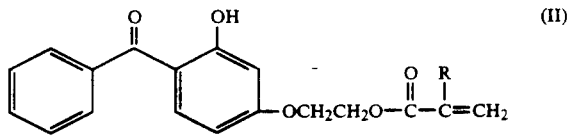

wherein R represents hydrogen or a methyl group, and 80 to 20% by weight of units which are the residues of an alkyl acrylate or methacrylate which has 1 to 4 carbon atoms in the alkyl group; said copolymer having a weight average molecular weight of from 5,000 to 100,000.

2. A stabilized acrylonitrile polymer fiber as claimed in claim 1, wherein said copolymer comprises units which are the residues of a benzophenone compound of the Formula (II) and units which are the residues of ethyl methacrylate or methyl methacrylate.

3. A stabilized acrylonitrile polymer fiber as claimed in claim 1, wherein the amount of said copolymer is from 0.01 to 10% by weight based on the weight of the acrylonitrile polymer.

4. A stabilized acrylonitrile polymer fiber as claimed in claim 1, wherein said copolymer comprises 20 to 70% by weight of said benzophenone compound and 80 to 30% by weight of the alkylacrylate or methacrylate.

5. A stabilized acrylonitrile polymer fiber as claimed in claim 1, wherein said acrylonitrile polymer is a copolymer comprised of a predominant amount of acrylonitrile and a minor amount of a halogen-containing monoethylenically unsaturated monomer.

* * * * *